United States Patent
Hong et al.

(10) Patent No.: US 11,743,982 B1
(45) Date of Patent: Aug. 29, 2023

(54) LIGHT SENSOR HAVING CONTROL COMPLEXITY REDUCING MECHANISM

(71) Applicant: ANPEC ELECTRONICS CORPORATION, Hsinchu (TW)

(72) Inventors: Jia-Hua Hong, Hsinchu (TW); Chih-Yuan Chen, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 17/953,418

(22) Filed: Sep. 27, 2022

(30) Foreign Application Priority Data

Jul. 27, 2022 (TW) .................................. 111128073

(51) Int. Cl.
| | |
|---|---|
| H01S 5/068 | (2006.01) |
| G01S 7/483 | (2006.01) |
| H05B 45/12 | (2020.01) |
| H05B 45/34 | (2020.01) |
| H05B 45/345 | (2020.01) |

(52) U.S. Cl.
CPC .............. *H05B 45/12* (2020.01); *H05B 45/34* (2020.01); *H05B 45/345* (2020.01)

(58) Field of Classification Search
CPC .. H01S 5/0427; H01S 5/06808; H01S 5/0683; G01S 7/483; G01S 7/1861; G01S 7/4873
See application file for complete search history.

(56) References Cited

U.S. PATENT DOCUMENTS

| | | | | |
|---|---|---|---|---|
| 5,309,269 | A * | 5/1994 | Shibao | H04B 10/564 372/38.07 |
| 5,946,334 | A * | 8/1999 | Ema | H01S 5/042 372/38.01 |
| 6,795,458 | B2 * | 9/2004 | Murata | H01S 5/042 372/38.02 |
| 2003/0010891 | A1 * | 1/2003 | Mizuhara | G01J 1/32 250/205 |
| 2003/0035451 | A1 * | 2/2003 | Ishida | H01S 5/042 372/38.02 |
| 2009/0190621 | A1 * | 7/2009 | Anderson | H01S 5/06825 372/38.03 |

* cited by examiner

*Primary Examiner* — Tung X Le
(74) *Attorney, Agent, or Firm* — Li & Cai Intellectual Property (USA) Office

(57) ABSTRACT

A light sensor having a control complexity reducing mechanism is provided. When light is emitted to a photodiode by both of an ambient light source and a light-emitting component, a first coarse count value is counted by a counter and then is sampled and held by a first sample and hold circuit. When light is emitted to the photodiode by only the ambient light source, a second coarse count value is counted by the counter and then is sampled and held by a second sample and hold circuit. After the coarse count values are held, the counter performs a fine counting operation on light intensity of the light emitted by both of the ambient light source and the light-emitting component to generate a first fine count value, and on light intensity of the light emitted by only the ambient light source to generate a second fine count value.

18 Claims, 5 Drawing Sheets

LIGHT SENSOR HAVING CONTROL COMPLEXITY REDUCING MECHANISM

CROSS-REFERENCE TO RELATED PATENT APPLICATION

This application claims the benefit of priority to Taiwan Patent Application No. 111128073, filed on Jul. 27, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a light sensor, and more particularly to a light sensor having a control complexity reducing mechanism.

BACKGROUND OF THE DISCLOSURE

Under different environments, different brightness is required for human eyes when viewing a screen of an electronic product. Therefore, light sensors such as ambient light sensors and proximity sensors are widely applied to electronic products such as mobile devices. The brightness of the screen of the electronic product must be automatically adjusted such that the human eyes can feel comfortable anywhere during use of the electronic product, according to values sensed by the light sensor.

SUMMARY OF THE DISCLOSURE

In response to the above-referenced technical inadequacies, the present disclosure provides a light sensor having a control complexity reducing mechanism. The light sensor includes a light sensor, a comparator, a counter, a sample and hold circuit, and a reference voltage modulating circuit. The light receiver is connected to a first terminal of a capacitor. A second terminal of the capacitor is grounded. The light receiver is configured to receive a first photocurrent of both of an ambient light source and a light-emitting component, and then provide the first photocurrent to the capacitor to charge the capacitor to a first voltage. The light receiver is configured to receive a second photocurrent of the ambient light source, and then provide the second photocurrent to the capacitor to charge the capacitor to a second voltage. A first input terminal of the comparator is connected to the first terminal of the capacitor. The first input terminal of the comparator is configured to receive the first voltage and the second voltage of the first terminal of the capacitor. A second input terminal of the comparator is coupled to a reference voltage. The comparator is configured to compare the first voltage with the reference voltage to output a first comparing signal. The comparator is configured to compare the second voltage with the reference voltage to output a second comparing signal. An input terminal of the counter is connected to an output terminal of the comparator. The counter is configured to count a first coarse count value according to the first comparing signal. The counter is configured to count a second coarse count value according to the second comparing signal. The sample and hold circuit is connected to the first terminal of the capacitor. The sample and hold circuit is configured to sample and hold the first voltage and the second voltage of the first terminal of the capacitor. The reference voltage modulating circuit is connected to the second input terminal and the output terminal of the comparator. The reference voltage modulating circuit is configured to sequentially output a first modulated reference voltage and a second modulated reference voltage to the second input terminal of the comparator. After the first coarse count value and the second coarse count value are counted, the comparator compares the first modulated reference voltage with the first voltage held by the sample and hold circuit to output a third comparing signal. The counter counts a first fine count value according to the third comparing signal. The comparator compares the second modulated reference voltage with the second voltage held by the sample and hold circuit to output a fourth comparing signal. The counter counts a second fine count value according to the fourth comparing signal.

In certain embodiments, the sample and hold circuit includes a first sample and hold circuit, and a second sample and hold circuit. The first sample and hold circuit is connected to the first terminal of the capacitor. The first sample and hold circuit is configured to sample and hold the first voltage of the first terminal of the capacitor. The second sample and hold circuit is connected to the first terminal of the capacitor. The second sample and hold circuit is configured to sample and hold the second voltage of the first terminal of the capacitor.

In certain embodiments, the light sensor further includes a first switch component and a second switch component. A first terminal of the first switch component is connected to an output terminal of the first sample and hold circuit. A second terminal of the first switch component is connected to the first input terminal of the comparator. A first terminal of the second switch component is connected to an output terminal of the second sample and hold circuit. A second terminal of the second switch component is connected to the first input terminal of the comparator.

In certain embodiments, the light sensor further includes a third switch component. A first terminal of the third switch component is connected to the first terminal of the capacitor. A second terminal of the third switch component is connected to the first input terminal of the comparator.

In certain embodiments, the light sensor further includes a fourth switch component. A first terminal of the fourth switch component is connected to the second terminal of the third switch component. A second terminal of the fourth switch component is connected to an input terminal of the first sample and hold circuit.

In certain embodiments, the light sensor further includes a fifth switch component. A first terminal of the fifth switch component is connected to the second terminal of the third switch component. A second terminal of the fifth switch component is connected to an input terminal of the second sample and hold circuit.

In certain embodiments, the light sensor further includes a sixth switch component. A first terminal of the sixth switch component is connected to the output terminal of the comparator. A second terminal of the sixth switch component is connected to the input terminal of the counter.

In certain embodiments, the light sensor further includes a seventh switch component. A first terminal of the seventh switch component is connected to the output terminal of the comparator. A second terminal of the seventh switch component is connected to an input terminal of the reference voltage modulating circuit.

In certain embodiments, the light sensor further includes an eighth switch component. A first terminal of the eighth switch component is connected to an output terminal of the reference voltage modulating circuit. A second terminal of the eighth switch component is connected to the second input terminal of the comparator.

In certain embodiments, the light sensor further includes a ninth switch component. A first terminal of the ninth switch component is connected to the second input terminal of the comparator. A second terminal of the ninth switch component is coupled to the reference voltage.

In certain embodiments, the light sensor further includes a tenth switch component. A first terminal of the tenth switch component is connected to the first terminal of the capacitor. A second terminal of the tenth switch component is grounded. A control terminal of the tenth switch component is connected to the second terminal of the sixth switch component.

In certain embodiments, the light sensor further includes an eleventh switch component. A first terminal of the eleventh switch component is connected to the first terminal of the capacitor. A second terminal of the eleventh switch component is grounded.

In certain embodiments, the light sensor further includes a twelfth switch component. A first terminal of the twelfth switch component is connected to an output terminal of the light receiver. A second terminal of the twelfth switch component is grounded.

In certain embodiments, the light sensor further includes a signal converter. An input terminal of the signal converter is connected to the second terminal of the seventh switch component. An output terminal of the signal converter is connected to the input terminal of the reference voltage modulating circuit.

In certain embodiments, the light sensor further includes a fine count value storing component. An input terminal of the fine count value storing component is connected to the output terminal of the signal converter.

In certain embodiments, the light sensor further includes a coarse count value storing component. An input terminal of the coarse count value storing component is connected to an output terminal of the counter.

In certain embodiments, the light sensor further includes a current adjusting circuit. The current adjusting circuit is connected between the light receiver and the capacitor. The current adjusting circuit is configured to amplify the first photocurrent and then provide the first photocurrent amplified to the capacitor. The current adjusting circuit is configured to amplify the second photocurrent and then provide the second photocurrent amplified to the capacitor.

In certain embodiments, the light receiver includes a photoelectric component. The photoelectric component is configured to convert light energy emitted by both of the ambient light source and the light-emitting component into the first photocurrent. The photoelectric component is configured to convert light energy emitted by only the ambient light source into the second photocurrent.

As described above, the present disclosure provides the light sensor having the control complexity reducing mechanism, which has advantages as described in the following.

In the circuit structure of the light sensor of the present disclosure, the same comparator and the same signal converter such as a successive-approximation analog-to-digital converter are configured to sense all of the photocurrents, thereby saving a circuit area of the light sensor.

The additional circuit components and the original circuit components of the circuit structure of the light sensor of the present disclosure are configured to effectively sense the light signals.

The light sensor of the present disclosure continuously senses the light signal within a single window time replacing the two non-consecutive times of the conventional light sensor. Therefore, the light signal sensed by the light sensor of the present disclosure only slightly changes over time. As a result, the count values that are counted according to the sensed light signal by the light sensor of the present disclosure are more accurate values.

The light sensor of the present disclosure senses all of the light signals within the single window time so as to effectively shorten the window time. Therefore, the light sensor of the present disclosure can be feasibly placed under a screen of an electronic device.

One of the two non-consecutive times can remain available for other optical applications rather than both being used in the sensing and coarse counting operations of the light signals sensed by the light sensor of the present disclosure. Therefore, the light sensor of the present disclosure can be flexibly used in various optical applications.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
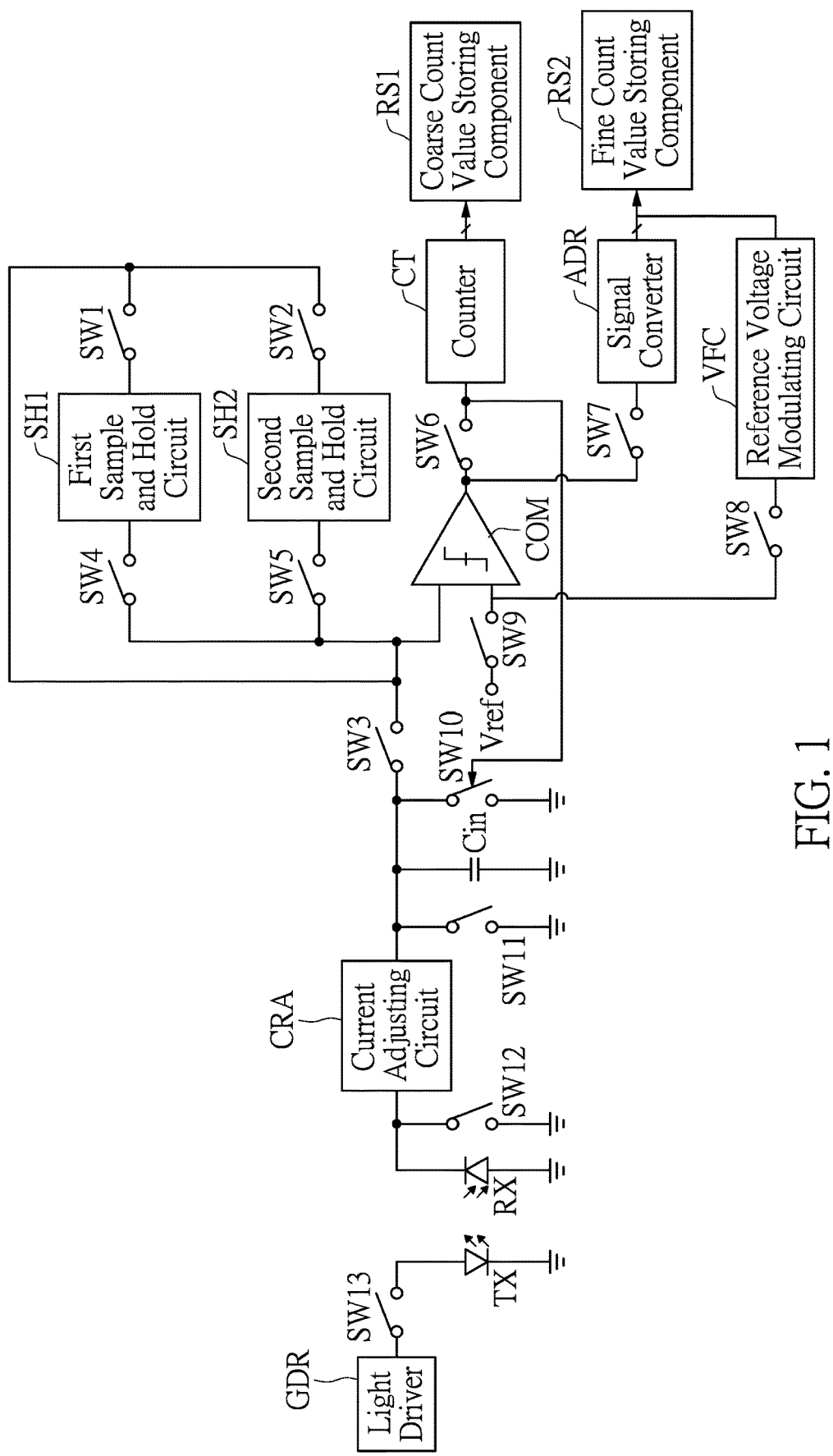
FIG. 1 is a circuit diagram of a light sensor having a control complexity reducing mechanism according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a circuit diagram of a light sensor having a control complexity reducing mechanism according to an embodiment of the present disclosure.

The light sensor of the embodiment of the present disclosure includes a plurality of circuit components such as a light receiver RX, a capacitor Cin, a current adjusting circuit CRA, first to twelfth switch components SW1 to SW12, a first sample and hold circuit SH1, a second sample and hold circuit SH2, a comparator COM, a counter CT, a signal converter ADR, a coarse count value storing component RS1, a fine count value storing component RS2 and a reference voltage modulating circuit VFC as shown in FIG. 1. For the convenience of explanation, the light sensor of the embodiment of the present disclosure includes all of the circuit components in FIG. 1 as described in the following, but the present disclosure is not limited thereto. In practice, the light sensor of the embodiment of the present disclosure may only include some of the circuit components in FIG. 1.

The light sensor of the embodiment of the present disclosure may be applied to an electronic device (such as, but not limited to, a mobile device). The electronic device may include a light transmitter TX such as a light-emitting diode as shown in FIG. 1. In practice, the electronic device may include other light-emitting components. The light transmitter TX may be connected to a light driver GDR. If necessary, a thirteenth switch component SW13 may be connected between the light driver GDR and the light transmitter TX. A first terminal of the thirteenth switch component SW13 may be connected to an output terminal of the light driver GDR. A second terminal of the thirteenth switch component SW13 may be connected to an input terminal of the light transmitter TX.

The light receiver RX such as a photoelectric component may be disposed corresponding to the light transmitter TX. A first terminal of the light receiver RX may be connected to an input terminal of the current adjusting circuit CRA such as a current amplifier. A second terminal of the light receiver RX may be grounded. An output terminal of the current adjusting circuit CRA may be connected to a first terminal of the capacitor Cin. A second terminal of the capacitor Cin may be grounded.

A first terminal of the eleventh switch component SW11 may be connected to the first terminal of the capacitor Cin. A second terminal of the eleventh switch component SW11 may be grounded.

A first terminal of the twelfth switch component SW12 may be connected to the light receiver RX such as the photoelectric component. The second terminal of the light receiver RX and a second terminal of the twelfth switch component SW12 may be grounded.

A first terminal of the third switch component SW3 may be connected to the first terminal of the capacitor Cin. A second terminal of the third switch component SW3 may be connected to a first input terminal of the comparator COM. A second input terminal of the comparator COM may be connected to a first terminal of the ninth switch component SW9. A second terminal of the ninth switch component SW9 may be coupled to a reference voltage Vref.

A second terminal of the third switch component SW3 may be connected to a first terminal of the fourth switch component SW4 and a first terminal of the fifth switch component SW5. A second terminal of the fourth switch component SW4 may be connected to an input terminal of the first sample and hold circuit SH1. A second terminal of the fifth switch component SW5 may be connected to an input terminal of the second sample and hold circuit SH2.

An output terminal of the first sample and hold circuit SH1 may be connected to a first terminal of the first switch component SW1. A second terminal of the first switch component SW1 may be connected to the first input terminal of the comparator COM.

An output terminal of the second sample and hold circuit SH2 may be connected to a first terminal of the second switch component SW2. A second terminal of the second switch component SW2 may be connected to the first input terminal of the comparator COM.

An output terminal of the comparator COM may be connected to a first terminal of the sixth switch component SW6. A second terminal of the sixth switch component SW6 may be connected to an input terminal of the counter CT. An output terminal of the counter CT may be connected to an input terminal of the coarse count value storing component RS1 such as a register.

The second terminal of the sixth switch component SW6 may be connected to a control terminal of the tenth switch component SW10. A first terminal of the tenth switch component SW10 may be connected to the first terminal of the capacitor Cin. A second terminal of the tenth switch component SW10 may be grounded.

The output terminal of the comparator COM may be connected to a first terminal of the seventh switch component SW7. A second terminal of the seventh switch component SW7 may be connected to an input terminal of the signal converter ADR. An output terminal of the signal converter ADR may be connected to an input terminal of the fine count value storing component RS2 such as a register, and an input terminal of the reference voltage modulating circuit VFC.

The input terminal of the reference voltage modulating circuit VFC may be connected to a first terminal of the eighth switch component SW8. A second terminal of the eighth switch component SW8 may be connected to the second input terminal of the comparator COM.

If necessary, a control terminal of each of the first to twelfth switch components SW1 to SW12 expect for the tenth switch component SW10 may be connected to an external controller (not shown in figures). The first to twelfth switch components SW1 to SW12 expect for the tenth switch component SW10 may be turned on or off by the external controller.

Figure 2:
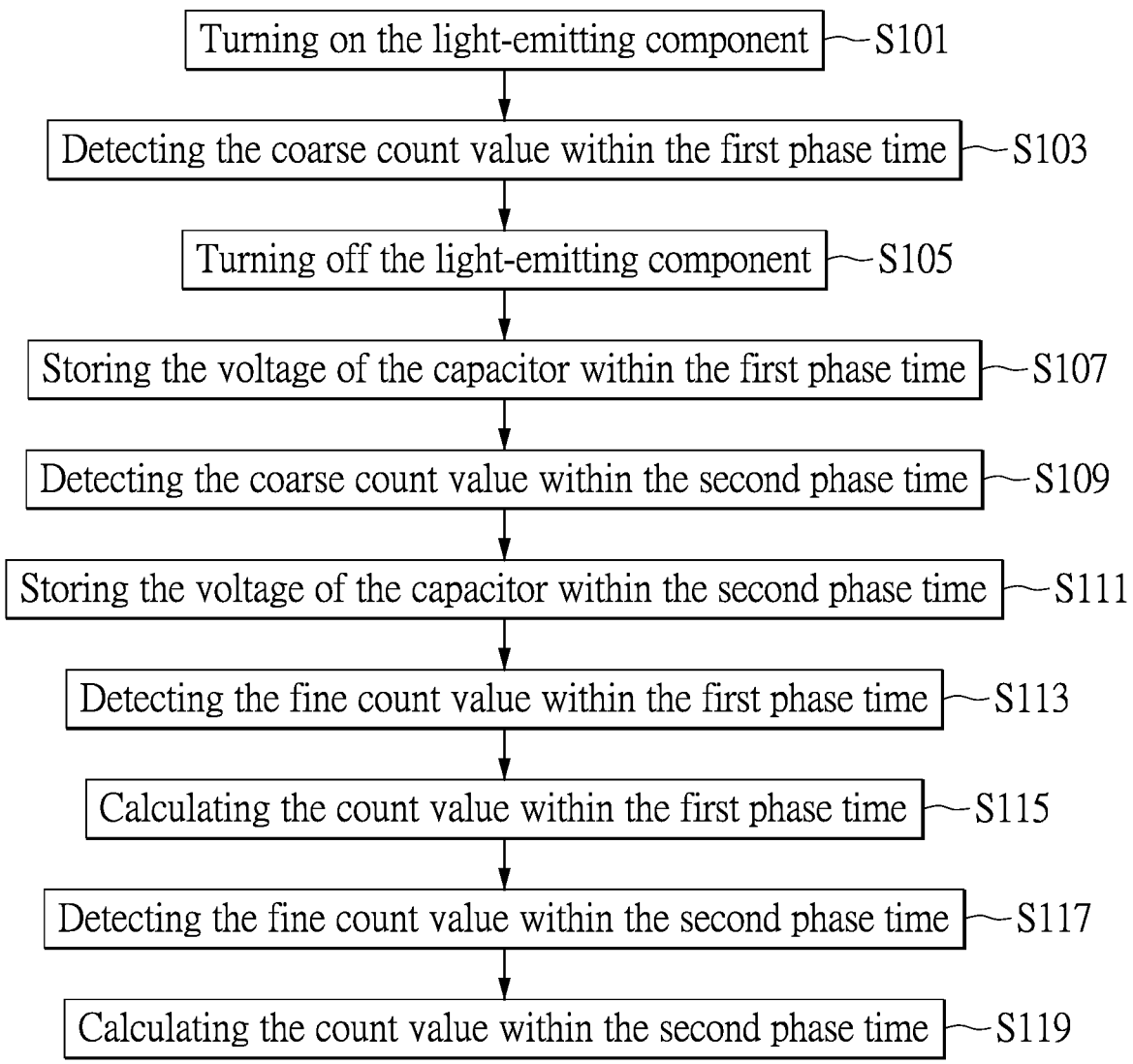
FIG. 2 is a flowchart diagram of the light sensor having the control complexity reducing mechanism according to the embodiment of the present disclosure.
Figure 3:
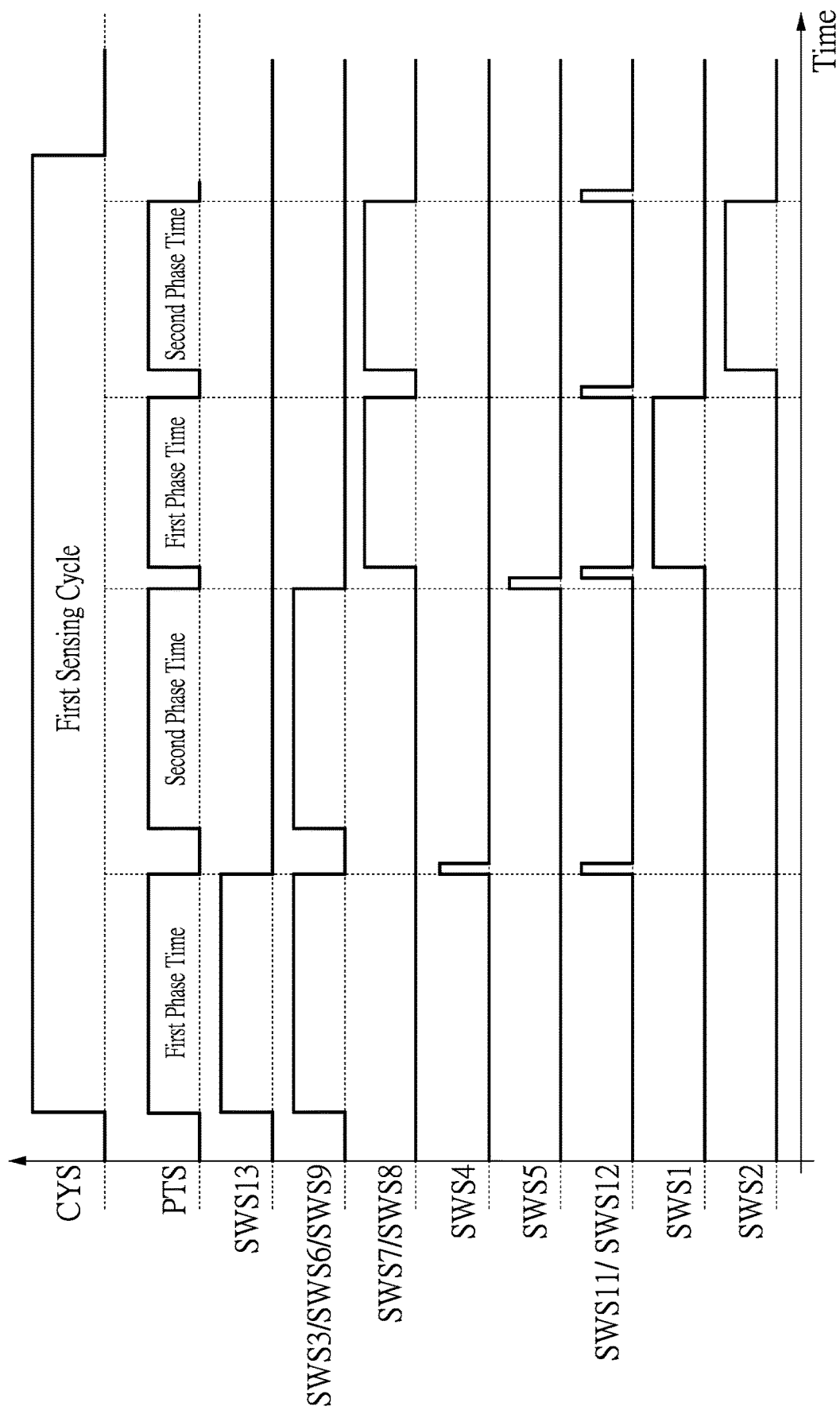
FIG. 3 is a waveform diagram of signals of the light sensor having the control complexity reducing mechanism according to the embodiment of the present disclosure.
Figure 4:
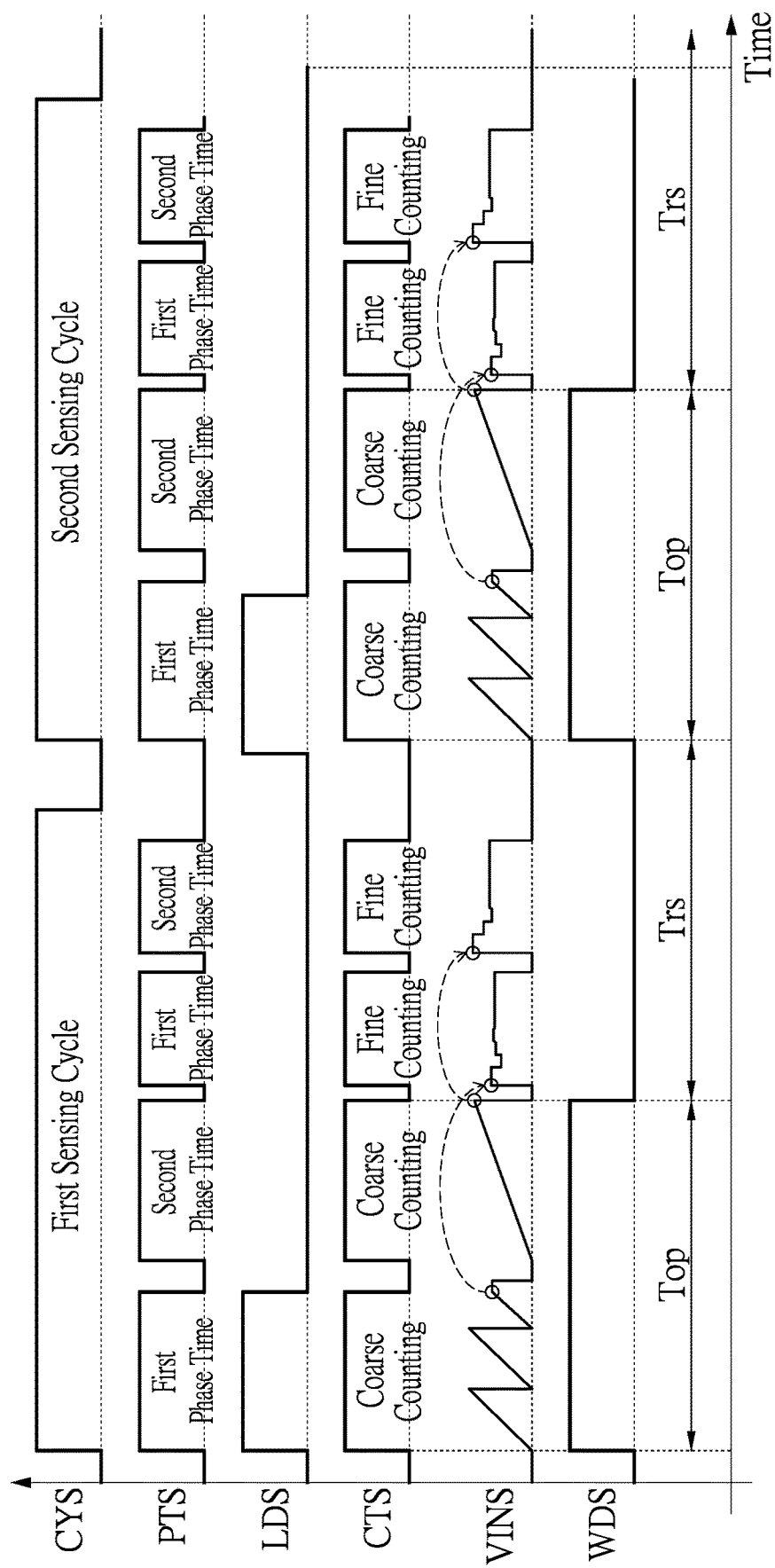
FIG. 4 is a waveform diagram of signals of the light sensor having the control complexity reducing mechanism according to the embodiment of the present disclosure.

Reference is made to FIGS. 1 to 4, in which FIG. 2 is a flowchart diagram of the light sensor having the control complexity reducing mechanism according to the embodiment of the present disclosure, and FIGS. 3 and 4 are waveform diagrams of signals of the light sensor having the control complexity reducing mechanism according to the embodiment of the present disclosure.

In step S101 of FIG. 2, the light driver GDR as shown in FIG. 1 may output a light driving signal to the light transmitter TX through the thirteenth switch component SW13 being turned on to drive the light transmitter TX such as the light-emitting diode to emit a light signal. Then, the light signal emitted by the light transmitter TX is reflected to the light receiver RX of the light sensor of the embodiment of the present disclosure (by a human body).

The light receiver RX such as the photoelectric component may convert light energy of the light signal that is emitted by both of the light transmitter TX and an ambient light source into a photocurrent. Then, the photocurrent (being adjusted, for example, being amplified by the current adjusting circuit CRA such as the current amplifier) flows to the capacitor Cin to charge the capacitor Cin.

For the convenience of description, a first voltage and a second voltage are defined herein. When the capacitor Cin is charged by the photocurrent converted from the light signal that is emitted by both of the light transmitter TX and the ambient light source and then is reflected (by the human body), a voltage of the capacitor Cin is defined as the first voltage. When the capacitor Cin is charged by the photocurrent converted from the light signal that is emitted by only the ambient light source, a voltage of the capacitor Cin is defined as the second voltage. It should be understood that, the (first and second) voltage of the capacitor Cin changes with a change in light intensity of the light signal.

In step S103 of FIG. 2, the light sensor of the present disclosure performs a coarse counting operation of a counting operation signal CTS, as shown in FIG. 4, on the light signal that is emitted by both of the light transmitter TX and the ambient light source and then is reflected (by the human body), within a first phase time of a phase time signal PTS as shown in FIGS. 3 and 4.

When the coarse counting operation is performed within the first phase time, the thirteenth switch component SW13 is turned on, which is represented by a thirteenth switch conduction signal SWS13 at a high level as shown in FIGS. 3 and 4. The light driving signal outputted by the light driver GDR is transmitted to the light transmitter TX through the thirteenth switch component SW13 being turned on. The light transmitter TX emits the light signal according to the light driving signal, which is represented by a light-emitting component signal LDS at a high level as shown in FIG. 4.

As shown in FIGS. 3 and 4, within the first phase time of the coarse counting operation of the light signal emitted by both of the light transmitter TX and the ambient light source, a third switch conduction signal SWS3, a sixth switch conduction signal SWS6 and a ninth switch conduction signal SWS9 are at a high level, which respectively represent that the third switch component SW3, the sixth switch component SW6 and the ninth switch component SW9 are turned on.

The first voltage of the capacitor Cin is inputted to the first input terminal of the comparator COM through the third switch component SW3 being turned on. The reference voltage Vref is inputted to the second input terminal of the comparator COM through the ninth switch component SW9 being turned on.

The capacitor Cin is charged to the first voltage by the photocurrent converted from the light energy of the light signal that is emitted by both of the light transmitter TX and the ambient light source and then is reflected (by the human body). Then, the comparator COM compares the first voltage of the capacitor Cin with the reference voltage Vref to output a first comparing signal. The first comparing signal of the comparator COM is transmitted to the counter CT and the control terminal of the tenth switch component SW10 through the sixth switch component SW6 being turned on.

Each time the counter CT determines that the first voltage of the capacitor Cin is higher than the reference voltage Vref according to a level (such as a high level) of the first comparing signal from the output terminal of the comparator COM, the counter CT counts a first coarse count value. The first coarse count value counted each time may be stored in the coarse count value storing component RS1.

After the comparator COM outputs the first comparing signal (at the high level) or the counter CT counts, the tenth switch component SW10 may be turned on according to the first comparing signal. At this time, the first input terminal of the comparator COM is grounded through the tenth switch component SW10 being turned on. As a result, a voltage of the first input terminal of the comparator COM is reset to a zero value.

The above-mentioned counting and resetting operations are performed for multiple times until the thirteenth switch component SW13 is turned off or the light transmitter TX stops emitting the light signal. At this time, the coarse counting operation of the light signal that is emitted by both of the light transmitter TX and the ambient light source and then is reflected (by the human body) is completed within the first phase time as shown in FIGS. 3 and 4.

In step S105 of FIG. 2, the thirteenth switch component SW13 is turned off, which is represented by the thirteenth switch conduction signal SWS13 at a low level as shown in FIG. 3, within a second phase time of a coarse counting operation. When the thirteenth switch component SW13 is turned off, the light driving signal of the light driver GDR cannot be transmitted to the light transmitter TX through the thirteenth switch component SW13. As a result, the light transmitter TX stops emitting the light signal. At this time, the light energy of the light signal is emitted by only the ambient light source but not the light transmitter TX, and then is received by the light receiver RX such as the photoelectric component.

In step S107 of FIG. 2, the fourth switch component SW4 is turned on for a short period of time, which is represented by a fourth switch conduction signal SWS4 at a high level as shown in FIG. 3. The first voltage of the capacitor Cin is transmitted to the first sample and hold circuit SH1 through the fourth switch component SW4 being turned on. The first sample and hold circuit SH1 samples and holds the first voltage of the capacitor Cin, which is represented by a capacitor voltage signal VINS as shown in FIG. 4. The first sample and hold circuit SH1 stores the first voltage of the capacitor Cin.

After the coarse counting operation of the light signal that is emitted by both of the light transmitter TX and the ambient light source and then is reflected (by the human body) is completed within the first phase time, the eleventh switch component SW11 and the twelfth switch component SW12 are turned on for a short period of time. As shown in FIG. 3, an eleventh switch conduction signal SWS11 and a twelfth switch conduction signal SWS12 are at a high level for the short period of time. When the eleventh switch component SW11 is turned on, the first input terminal of the comparator COM is connected to a ground through the eleventh switch component SW11. As result, the voltage of the first input terminal of the comparator COM is reset to the zero value. When the twelfth switch component SW12 is turned on, the input terminal of the current adjusting circuit CRA is connected to the ground through the twelfth switch component SW12. As a result, a voltage of the input terminal of the current adjusting circuit CRA is reset to the zero value.

In step S109 of FIG. 2, the light sensor of the present disclosure performs a coarse counting operation of the counting operation signal CTS as shown in FIG. 4 on the light intensity of the light signal emitted by only the ambient light source, within the second phase time of the phase time signal PTS as shown in FIGS. 3 and 4.

In the coarse counting operation of the ambient light source, the light receiver RX such as the photoelectric component receives the light signal emitted by only the ambient light source and converts the light signal of the ambient light source into a second photocurrent. The light receiver RX provides the second photocurrent to the capacitor Cin to charge the capacitor Cin to the second voltage.

As shown in FIGS. 3 and 4, within the second phase time of the coarse counting operation, the third switch conduction signal SWS3, the sixth switch conduction signal SWS6 and the ninth switch conduction signal SWS9 are at a high level, which respectively represent that the third switch component SW3, the sixth switch component SW6 and the ninth switch component SW9 are turned on.

The second voltage of the first terminal of the capacitor Cin is inputted to the first input terminal of the comparator COM through the third switch component SW3 being turned on. The comparator COM compares the second voltage of the first terminal of the capacitor Cin with the reference voltage Vref to output a second comparing signal. At this time, the sixth switch component SW6 is turned on. The second comparing signal is transmitted to the counter CT and the control terminal of the tenth switch component SW10 through the sixth switch component SW6 being turned on.

Each time the counter CT determines that the second voltage of the first terminal of the capacitor Cin is higher than the reference voltage Vref according to a (high) level of the second comparing signal from the output terminal of the comparator COM, the counter CT counts a second coarse count value. The second coarse count value counted each time may be stored in the coarse count value storing component RS1.

After the comparator COM outputs the second comparing signal (at the high level) or the counter CT counts, the tenth switch component SW10 may be turned on according to the second comparing signal. The first input terminal of the comparator COM is grounded through the tenth switch component SW10 being turned on. As a result, the voltage of the first input terminal of the comparator COM is reset to the zero value.

The above-mentioned counting and resetting operations are performed for multiple times when the ambient light source is stable or the ambient light source is detected for a period of time. At this time, the coarse counting operation of the ambient light source is completed within the second phase time of the phase time signal PTS as shown in FIGS. 3 and 4.

In step S111 of FIG. 2, the fifth switch component SW5 is turned on for a short period of time, which is represented by a fifth switch conduction signal SWS5 at a high level as shown in FIG. 3. The second voltage of the first terminal of the capacitor Cin is transmitted to the second sample and hold circuit SH2 through the fifth switch component SW5 being turned on. The second sample and hold circuit SH2 samples and holds the second voltage of the first terminal of the capacitor Cin, which is represented by the capacitor voltage signal VINS as shown in FIG. 4. The second sample and hold circuit SH2 stores the second voltage of the first terminal of the capacitor Cin.

After the coarse counting operation of the light signal that is emitted by only the ambient light source is completed within the second phase time, the eleventh switch component SW11 and the twelfth switch component SW12 are turned on for a short period of time. As shown in FIG. 3, the eleventh switch conduction signal SWS11 and the twelfth switch conduction signal SWS12 are at a high level for the short period of time. When the eleventh switch component SW11 is turned on, the first input terminal of the comparator COM is connected to the ground through the eleventh switch component SW11. As a result, the voltage of the first input terminal of the comparator COM is reset to the zero value. When the twelfth switch component SW12 is turned on, the input terminal of the current adjusting circuit CRA is connected to the ground through the twelfth switch component SW12. As a result, the voltage of the input terminal of the current adjusting circuit CRA is reset to the zero value.

In step S113 of FIG. 2, within a first phase time of the phase time signal PTS as shown in FIGS. 3 and 4, the light sensor of the present disclosure performs a fine counting operation of the counting operation signal CTS as shown in FIG. 4 on the light signal that is emitted by both of the light transmitter TX and the ambient light source and then is reflected (by the human body).

When the fine counting operation is performed on the light signal that is emitted by both of the light transmitter TX and the ambient light source and then is reflected (by the human body), the first switch component SW1, the seventh switch component SW7 and the eighth switch component SW8 are turned on. As shown in FIGS. 3 and 4, a first switch conduction signal SWS1, a seventh switch conduction signal SWS7 and an eighth switch conduction signal SWS8 are at a high level within the first phase time of the fine counting operation.

The first voltage of the capacitor Cin previously sampled and held by the first sample and hold circuit SH1 is outputted to the first input terminal of the comparator COM through the first switch component SW1 being turned on. Then, the reference voltage modulating circuit VFC outputs a first modulated reference voltage to the second input terminal of the comparator COM through the eighth switch component SW8 being turned on.

The comparator COM compares the first voltage of the capacitor Cin held by the first sample and hold circuit SH1 with the first modulated reference voltage from the reference voltage modulating circuit VFC to output a third comparing signal to the signal converter ADR through the seventh switch component SW7 being turned on.

For example, the signal converter ADR may be a successive-approximation analog-to-digital converter (SAR), but the present disclosure is not limited thereto. The signal converter ADR may convert the third comparing signal that is an analog signal into a first digital signal, and then may provide the first digital signal to one or both of the fine count value storing component RS2 and the reference voltage modulating circuit VFC.

The fine count value storing component RS2, such as the register, may store the first digital signal from the signal converter ADR. The reference voltage modulating circuit VFC may adjust the first modulated reference voltage inputted to the second input terminal of the comparator COM once or multiple times, according to the first digital signal from the signal converter ADR or the fine count value storing component RS2.

The above-mentioned operations are performed multiple times to generate a first fine count value according to the first digital signal. The first fine count value may be stored in the fine count value storing component RS2.

In step S115 of FIG. 2, an arithmetic operation may be performed on the first coarse count value and the first fine count value that are counted within the first phase time to calculate a first count value of the first phase time.

In step S117 of FIG. 2, a fine counting operation of the counting operation signal CTS as shown in FIG. 4 is performed on the light signal that is emitted by only the ambient light source within a second phase time of the phase time signal PTS as shown in FIGS. 3 and 4.

When the fine counting operation is performed on the light signal that is emitted by only the ambient light source, the second switch component SW2, the seventh switch component SW7 and the eighth switch component SW8 are turned on. As shown in FIGS. 3 and 4, a second switch conduction signal SWS2, the seventh switch conduction signal SWS7 and the eighth switch conduction signal SWS8 are at a high level within the second phase time of the fine counting operation.

The second voltage of the first terminal of the capacitor Cin previously sampled and held by the second sample and hold circuit SH2 is outputted to the first input terminal of the comparator COM through the second switch component SW2 being turned on. Then, the reference voltage modulating circuit VFC outputs a second modulated reference voltage to the second input terminal of the comparator COM through the eighth switch component SW8 being turned on.

The comparator COM compares the second voltage of the first terminal of the capacitor Cin held by the second sample and hold circuit SH2 with the second modulated reference voltage from the reference voltage modulating circuit VFC to output a fourth comparing signal to the signal converter ADR through the seventh switch component SW7 being turned on.

The signal converter ADR may convert the fourth comparing signal that is an analog signal into a second digital signal and may provide the second digital signal to one or both of the second sample and hold circuit SH2 and the reference voltage modulating circuit VFC.

The fine count value storing component RS2 such as the register may store the second digital signal from the signal converter ADR. The reference voltage modulating circuit VFC may modulate the second modulated reference voltage inputted to the second input terminal of the comparator COM once or multiple times, according to the second digital signal from the signal converter ADR or the fine count value storing component RS2.

The above-mentioned operations are performed multiple times to generate a second fine count value according to the second digital signal. Then, second fine count value may be stored in the fine count value storing component RS2.

In step S119 of FIG. 2, an arithmetic operation may be performed on the second coarse count value and the second fine count value that are counted within the second phase time to calculate a second count value of the second phase time.

Finally, the second count value of the ambient light source may be subtracted from the first count value of the light signal that is emitted by both of the light transmitter TX and the ambient light source and then is reflected by the human body, to count a final count value of the light signal that is emitted by only the light transmitter TX and then is reflected by the human body. The light intensity of the light signal that is reflected to the light receiver RX by the human body is calculated according to the final count value. A distance between the human body and the electronic device in which the light sensor is disposed is calculated, according to a difference between the light intensity of the reflected light signal and the light intensity of the light signal emitted by the light transmitter TX.

In practice, an order of steps S101 to S119 of FIG. 2 may be appropriately adjusted according to actual requirements. For example, after the second coarse count value of the ambient light source is counted, the first coarse count value of the light signal that is emitted by both of the light transmitter TX and the ambient light source is counted, but the present disclosure is not limited thereto.

Figure 5:
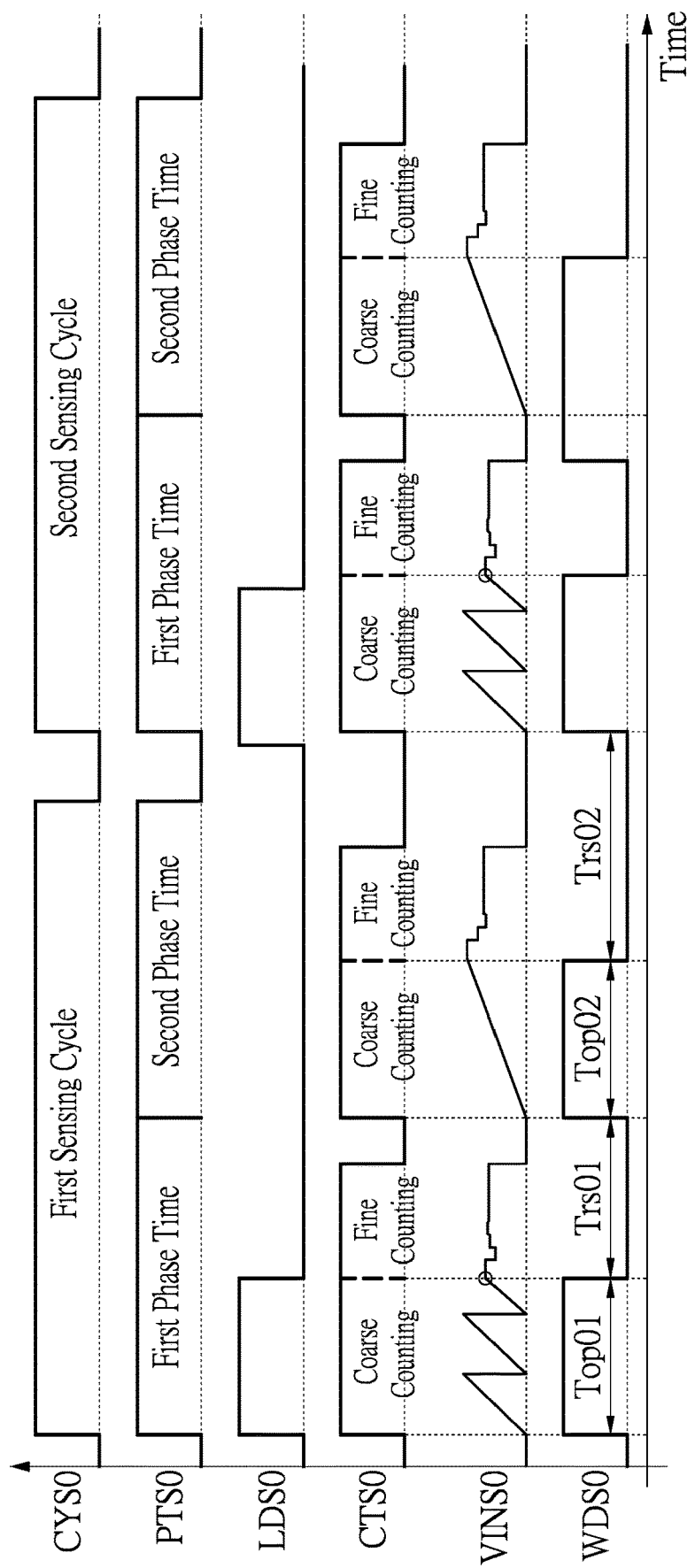
FIG. 5 is a waveform diagram of signals of a conventional light sensor.

Reference is made to FIGS. 4 and 5, in which FIG. 4 is a waveform diagram of signals of the light sensor having the control complexity reducing mechanism according to the embodiment of the present disclosure, and FIG. 5 is a waveform diagram of signals of a conventional light sensor.

As shown in FIG. 5, within a first window time Top01 of a window signal WDS0, a light-emitting component signal LDS0 is at a high level, which represents that a light transmitter of the conventional light sensor is turned on to emit a light signal. Within the first window time Top01 of the window signal WDS0 of each of a plurality of sensing cycles of a sensing cycle signal CYS0, a light receiver of the conventional light sensor is turned on to receive the light signal that is emitted by both the light transmitter and the ambient light source and then is reflected (by the human body). Then, the conventional light sensor performs a sensing operation and a coarse counting operation of a counting operation signal CTS0 on the light signal (or a voltage of a capacitor being charged by a photocurrent converted from the light signal, such as a voltage of a capacitor voltage signal VINS0 as shown in FIG. 5). As a result, the conventional light sensor generates a first course count value within the first window time Top01 in a first phase time of a phase time signal PTS0. Then, the window signal WDS0 transits from a high level to a low level, and is maintained at the low level during a first non-window time Trs01. The light receiver of the conventional light sensor is turned off and stops receiving the light signal during the first non-window time Trs01 of the window signal WDS0. The conventional light sensor performs a fine counting operation on the first coarse count value to count a first fine count value within the first non-window time Trs01 of the window signal WDS0.

Then, the window signal WDS0 transits from the low level back to the high level, and is maintained at the high level during a second window time Top02. The light receiver of the conventional light sensor is turned on to receive the light signal emitted by only the ambient light source within the second window time Top02 of the window signal WDS0. The conventional light sensor performs a sensing operation and a coarse counting operation of the counting operation signal CTS0 on the light signal of the ambient light source to count a second coarse count value.

Then, the window signal WDS0 transits from the high level back to the low level, and is maintained at the low level during a second non-window time Trs02. The light receiver of the conventional light sensor is turned off and stops receiving the light signal during the second non-window time Trs02 of the window signal WDS0. The conventional light sensor performs a fine counting operation on the second coarse count value to count a second fine count value within the second non-window time Trs02 of the window signal WDS0.

In contrast, only within a single window time Top of the window signal WDS of each of the plurality of sensing cycles of a sensing cycle signal CYS as shown in FIG. 4, the light receiver RX of the light sensor of the present disclosure is turned on to receive the light signal. Then, the light sensor of the present disclosure performs the sensing operations and the coarse counting operations of the counting operation signal CTS as shown in FIG. 4 on the light signal emitted by both of the light transmitter TX and the ambient light source and then is reflected (by the human body), and on the light signal emitted by only the ambient light source.

After all of the sensing and coarse counting operations of each of the plurality of sensing cycles are completed, the light receiver RX of the light sensor of the present disclosure is turned off and stops receiving the light signal within a non-window time Trs of the window signal WDS. As shown in FIG. 4, the window signal WDS transits from the high level to the low level, and is maintained at the low level during the non-window time Trs in each of the sensing cycles of the sensing cycle signal CYS. The light sensor of the present disclosure performs the fine counting operations on the first coarse count value and the second coarse count value to respectively count the first fine count value and the second fine count value, within the non-window time Trs of the window signal WDS.

In brief, the light receiver RX of the present disclosure is only turned on within the single window time Top in each of the plurality of sensing cycles. In contrast, the light receiver of the conventional light sensor is turned on within the first window time Top01 and the second window time Top02 that are two non-consecutive times. The first non-window time Trs01 exists between the first window time Top01 and the second window time Top02. The second non-window time Trs02 exists between the second window time Top02 and the next first window time Top01. It is apparent that, a complexity of a time control mechanism applied by the light sensor of the present disclosure is lower than that of the conventional light sensor.

Beneficial Effects of the Embodiments

In conclusion, the present disclosure provides the light sensor having the control complexity reducing mechanism, which has advantages described as follows.

In the circuit structure of the light sensor of the present disclosure, the same comparator and the same signal converter such as the successive-approximation analog-to-digital converter are configured to sense all of the photocurrents, thereby saving a circuit area of the light sensor.

The additional circuit components and the original circuit components of the circuit structure of the light sensor of the present disclosure are configured to effectively sense the light signals.

The light sensor of the present disclosure continuously senses the light signals within a single window time replacing the two non-consecutive times of the conventional light sensor. Therefore, the light signals sensed by the light sensor of the present disclosure only slightly change over time. As a result, the count values that are counted according to the sensed light signals by the light sensor of the present disclosure are more accurate values.

The light sensor of the present disclosure senses all of the light signals within the single window time so as to effectively shorten the window time. Therefore, the light sensor of the present disclosure can be feasibly placed under a screen of an electronic device.

One of the two non-consecutive times can remain available for other optical applications rather than both being used in the sensing and coarse counting operations of the light signals sensed by the light sensor of the present disclosure. Therefore, the light sensor of the present disclosure can be flexibly used in various optical applications.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A light sensor having a control complexity reducing mechanism, comprising:
    a light receiver connected to a first terminal of a capacitor, wherein a second terminal of the capacitor is grounded, the light receiver is configured to receive a first photocurrent of both of an ambient light source and a light-emitting component and then provide the first photocurrent to the capacitor to charge the capacitor to a first voltage, and the light receiver is configured to receive a second photocurrent of the ambient light source and then provide the second photocurrent to the capacitor to charge the capacitor to a second voltage;
    a comparator, wherein a first input terminal of the comparator is connected to the first terminal of the capacitor and configured to receive the first voltage and the second voltage of the first terminal of the capacitor, a second input terminal of the comparator is coupled to a reference voltage, the comparator is configured to compare the first voltage with the reference voltage to output a first comparing signal, and the comparator is configured to compare the second voltage with the reference voltage to output a second comparing signal;
    a counter, wherein an input terminal of the counter is connected to an output terminal of the comparator, the counter is configured to count a first coarse count value according to the first comparing signal, and the counter is configured to count a second coarse count value according to the second comparing signal;
    a sample and hold circuit connected to the first terminal of the capacitor, and configured to sample and hold the first voltage and the second voltage of the first terminal of the capacitor; and
    a reference voltage modulating circuit connected to the second input terminal and the output terminal of the comparator, and configured to sequentially output a first modulated reference voltage and a second modulated reference voltage to the second input terminal of the comparator;
    wherein, after the first coarse count value and the second coarse count value are counted, the comparator compares the first modulated reference voltage with the first voltage held by the sample and hold circuit to output a third comparing signal, the counter counts a first fine count value according to the third comparing signal, the comparator compares the second modulated reference voltage with the second voltage held by the sample and hold circuit to output a fourth comparing signal, and the counter counts a second fine count value according to the fourth comparing signal.

2. The light sensor according to claim 1, wherein the sample and hold circuit includes:
   a first sample and hold circuit connected to the first terminal of the capacitor, and configured to sample and hold the first voltage of the first terminal of the capacitor; and
   a second sample and hold circuit connected to the first terminal of the capacitor, and configured to sample and hold the second voltage of the first terminal of the capacitor.

3. The light sensor according to claim 2, further comprising:
   a first switch component, wherein a first terminal of the first switch component is connected to an output terminal of the first sample and hold circuit, and a second terminal of the first switch component is connected to the first input terminal of the comparator; and
   a second switch component, wherein a first terminal of the second switch component is connected to an output terminal of the second sample and hold circuit, and a second terminal of the second switch component is connected to the first input terminal of the comparator.

4. The light sensor according to claim 3, further comprising:
   a third switch component, wherein a first terminal of the third switch component is connected to the first terminal of the capacitor, and a second terminal of the third switch component is connected to the first input terminal of the comparator.

5. The light sensor according to claim 4, further comprising:
   a fourth switch component, wherein a first terminal of the fourth switch component is connected to the second terminal of the third switch component, and a second terminal of the fourth switch component is connected to an input terminal of the first sample and hold circuit.

6. The light sensor according to claim 5, further comprising:
   a fifth switch component, wherein a first terminal of the fifth switch component is connected to the second terminal of the third switch component, and a second terminal of the fifth switch component is connected to an input terminal of the second sample and hold circuit.

7. The light sensor according to claim 6, further comprising:
   a sixth switch component, wherein a first terminal of the sixth switch component is connected to the output terminal of the comparator, and a second terminal of the sixth switch component is connected to the input terminal of the counter.

8. The light sensor according to claim 7, further comprising:
   a seventh switch component, wherein a first terminal of the seventh switch component is connected to the output terminal of the comparator, and a second terminal of the seventh switch component is connected to an input terminal of the reference voltage modulating circuit.

9. The light sensor according to claim 8, further comprising:
   an eighth switch component, wherein a first terminal of the eighth switch component is connected to an output terminal of the reference voltage modulating circuit, and a second terminal of the eighth switch component is connected to the second input terminal of the comparator.

10. The light sensor according to claim 9, further comprising:
    a ninth switch component, wherein a first terminal of the ninth switch component is connected to the second input terminal of the comparator, and a second terminal of the ninth switch component is coupled to the reference voltage.

11. The light sensor according to claim 10, further comprising:
    a tenth switch component, wherein a first terminal of the tenth switch component is connected to the first terminal of the capacitor, a second terminal of the tenth switch component is grounded, and a control terminal of the tenth switch component is connected to the second terminal of the sixth switch component.

12. The light sensor according to claim 11, further comprising:
    an eleventh switch component, wherein a first terminal of the eleventh switch component is connected to the first terminal of the capacitor, and a second terminal of the eleventh switch component is grounded.

13. The light sensor according to claim 12, further comprising:
    a twelfth switch component, wherein a first terminal of the twelfth switch component is connected to an output terminal of the light receiver, and a second terminal of the twelfth switch component is grounded.

14. The light sensor according to claim 8, further comprising:
    a signal converter, wherein an input terminal of the signal converter is connected to the second terminal of the seventh switch component, and an output terminal of the signal converter is connected to the input terminal of the reference voltage modulating circuit.

15. The light sensor according to claim 14, further comprising:
    a fine count value storing component, wherein an input terminal of the fine count value storing component is connected to the output terminal of the signal converter.

16. The light sensor according to claim 1, further comprising:
    a coarse count value storing component, wherein an input terminal of the coarse count value storing component is connected to an output terminal of the counter.

17. The light sensor according to claim 1, further comprising:
    a current adjusting circuit connected between the light receiver and the capacitor, configured to amplify the first photocurrent and then provide the first photocurrent amplified to the capacitor, and configured to amplify the second photocurrent and then provide the second photocurrent amplified to the capacitor.

18. The light sensor according to claim 1, wherein the light receiver includes a photoelectric component, the photoelectric component is configured to convert light energy emitted by both of the ambient light source and the light-emitting component into the first photocurrent, and configured to convert light energy emitted by only the ambient light source into the second photocurrent.

* * * * *